United States Patent [19]
Gilbert et al.

[11] Patent Number: 5,953,709
[45] Date of Patent: Sep. 14, 1999

[54] AUTOMATED VOUCHER CASH-OUT SYSTEM AND METHOD

[75] Inventors: Keith Gilbert, Richmond, Va.; Glenn A. Welstad; Todd Welstad, both of Gig Harbor, Wash.

[73] Assignee: Labor Ready, Inc., Tacoma, Wash.

[21] Appl. No.: 09/026,209

[22] Filed: Feb. 19, 1998

[51] Int. Cl.⁶ .................................................. B42D 15/00

[52] U.S. Cl. .................. 705/35; 705/14; 705/16; 705/17; 194/217; 194/347

[58] Field of Search ..................... 194/217, 347; 453/3; 705/35, 14, 16, 17, 21, 43

[56] References Cited

U.S. PATENT DOCUMENTS 5,620,079  4/1997  Molbak .................................... 194/217

*Primary Examiner*—Thomas R. Peeso
*Attorney, Agent, or Firm*—Meschkow & Gresham,P.L.C.; Jordan M. Meschkow; Lowell W. Gresham

[57] ABSTRACT

A voucher cash-out system (20) includes a service terminal (22) for producing a voucher (58) in response to a received service request (50). A processor (24) in communication with the service terminal (22), manages a cash disbursement relative to a cash worth (62) of the voucher (58). An automated cash disbursement machine (28), in communication with the processor (24), is configured to perform the cash disbursement in response to validation of the voucher (58) by the processor (24).

20 Claims, 4 Drawing Sheets

| DATE | EMPLOYEE ID | BANK DRAFT | | VOUCHER | | | |
|---|---|---|---|---|---|---|---|
| | | ISSUE | NO. | ISSUE | VOUCHER ID | CASH WORTH | CASH-OUT |
| MM/DD/YY | EMPLOYEE 1 | N | | Y | 0012564394/5018 | 73.52 | 110 |
| | EMPLOYEE 2 | N | | Y | 0012564395/7243 | 52.18 | ✓ |
| | EMPLOYEE 3 | Y | 5251 | N | 112 | | |
| | EMPLOYEE 4 | Y | 5252 | Y | 0012564396/3214 | 24.32 | |
| | ⋮ | ⋮ | ⋮ | ⋮ | ⋮ | ⋮ | ⋮ |

AUTOMATED VOUCHER CASH-OUT SYSTEM AND METHOD

TECHNICAL FIELD OF THE INVENTION

The present invention relates in general to payroll systems, and more particularly, to an automated system and method for providing an employee with a cash payout relative to a quantity of hours worked.

BACKGROUND OF THE INVENTION

Employees are generally paid by issuance of a bank draft in response to a quantity of hours worked, or in response to a task that was successfully completed. This bank draft is conventionally known as a paycheck. Alternatively, an employee may be paid by direct deposit, in which the employer deposits the paycheck directly into an employee's bank account. The employees that receive pay by direct deposit are generally permanent employees within a specific company.

Some companies, known as employment contractors, provide other companies or individuals with temporary, or short term, employees. These employees may work for a short period, such as one day, one week, or until a specific task is completed. Following the completion of the work, the employment contractor may then assign the employee to a new job at a different jobsite.

The employment contractors generally do not arrange direct deposit payments for these short term employees. Rather, these employees are provided with a paycheck that may be issued on a frequent basis, such as a daily issuance of a paycheck. While paychecks are an effective and secure means of paying employees, many short term employees experience difficulty in cashing the paycheck. For example, the employee's bank may be located a significant distance from where the employee receives his or her paycheck. This may make it unfeasible for the employee to get to the bank during business hours.

In addition, some of the short term employees may not have check cashing privileges through a bank. Hence, these employees are obligated to cash their paychecks at an alternative check cashing service. Unfortunately, these services may also be located a significant distance from the employee, making it difficult for the employee to cash his or her paycheck. Furthermore, these services often charge a costly service fee for cashing a paycheck. This service fee places a significant financial burden on the employee.

An employee may desire cash for his or her paycheck as soon as possible following the work performed in order to cover expenses that the employee may incur after leaving the jobsite. These expenses may include fueling up an automobile, buying groceries, paying a childcare provider, and so forth. The additional requirement of cashing the paycheck at a bank or check-cashing service undesirably increases the time it takes to receive cash for a paycheck.

SUMMARY OF THE INVENTION

Accordingly, an advantage of the present invention is that an automated voucher cash-out system and method are provided for performing a cash disbursement to an employee.

Another advantage of the present invention is that a system and method are provided for performing a cash disbursement immediately following issuance of a voucher.

Another advantage of the present invention is that a system and method are provided that performs a cash disbursement to an employee in the same vicinity from which the voucher is issued.

Another advantage of the present invention is that a system and method are provided that cost effectively performs a cash disbursement to an employee.

Yet another advantage of the present invention is that a system and method are provided that includes validation mechanisms for securely performing cash disbursement to an employee.

The above and other advantages of the present invention are carried out in one form by an automated voucher cash-out system. The voucher cash-out system includes a service terminal for producing a voucher in response to a received service request. A processor, in communication with the service terminal, manages a cash disbursement of the voucher. An automated cash disbursement machine, in communication with the processor, is configured to perform the cash disbursement in response to validation of the voucher by the processor.

The above and other advantages of the present invention are carried out in another form by a voucher cash-out method. The method calls for producing a voucher representative of a cash disbursement to be made. The method further calls for validating the voucher and performing a cash disbursement of the voucher. Following cash disbursement, the method calls for flagging a cash-out status field associated with the voucher in a payment database.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 5 shows an illustration of a payment database including exemplary payment.

DETAILED DESCRIPTION OF THE PREFERRED EMBODIMENTS

Figures 1, 3:
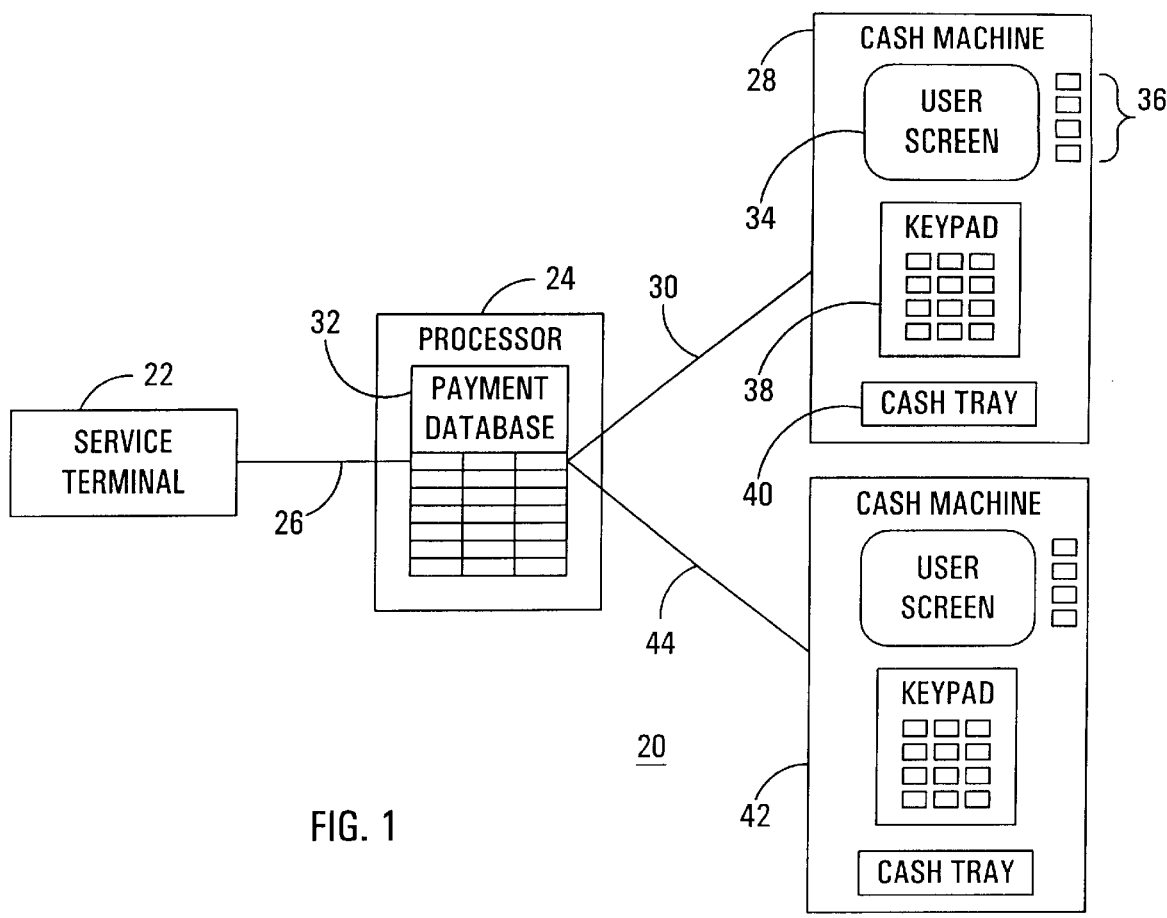
FIG. 1 shows a block diagram of an automated voucher cash-out system.
FIG. 3 shows an illustration of an exemplary work ticket.

FIG. 1 shows a block diagram of an automated voucher cash-out system 20. Voucher cash-out system 20 includes a service terminal 22 in communication with a processor 24 via a data transfer link 26. Likewise, processor 24 is in communication with an automated cash disbursement machine (CASH MACHINE) 28 via a communication link 30. Processor 24 includes a payment database 32, and service terminal 22 is configured to record payment data (discussed below) into payment database 32 in response to a service request (discussed below).

Service terminal 22 is a conventional microprocessor based computer system which may include a keyboard, monitor, printer, and memory (not shown). Payroll calculation, approval, and processing routines reside in the memory of service terminal 22, and are invoked in response to a received service request (discussed below). Voucher cash-out system 20 may also include additional service terminals (not shown) in communication with processor 24 via additional data transfer links (not shown). Those skilled in the art will recognize that these additional service terminals may be configured similarly to service terminal 22 to record payment data to payment database 32 in order to respond to a higher volume of service requests (discussed below).

Processor 24 is a conventional microprocessor based computer system and may have other functions unrelated to voucher cash-out. For example, processor 24 may be a server in larger computer network in which voucher cash-out system 20 is located. Processor 24 includes user specific database and processing routines housed in computer memory (not shown) for managing cash disbursement to the employees.

Cash disbursement machine 28 includes a user screen 34, screen entry buttons 36, a keypad 38, and a cash tray 40, all of which are provided for interfacing with an employee. Cash disbursement machine 28 is configured to perform a cash payout, or cash disbursement, in response to validation by processor 24 of a voucher (discussed below) input by an employee.

In addition, voucher cash-out system 20 may include a second automated cash disbursement machine (CASH MACHINE) 42 in communication with processor 24 via a communication link 44. Second cash disbursement machine 42 is configured to perform a second cash disbursement, in response to validation by processor 24 of a second voucher input by a second employee.

Second cash machine 42 is configured in a similar manner to cash machine 28 so that system 20 may provide cash disbursements substantially concurrently at first and second cash machines 28 and 42. Thus, system 20 accommodates more than one employee at any given time in order to more efficiently provide cash disbursement. Accordingly, although the following discussion specifies first automated cash machine 28 for clarity of illustration, it should be readily apparent that the following discussion also applies to second cash disbursement machine 42 or any number of cash disbursement machines that are similarly configured.

In the preferred embodiment, voucher cash-out system 20 is provided to perform a cash disbursement to short term employees, such as those hired by a contracting agency. System 20 may be installed at or near a jobsite, so that employees who are paid frequently, such as daily, may conveniently have the option of receiving cash in place of a conventional paycheck shortly after completion of the work. However, those skilled in the art will recognize that voucher cash-out system 20 may be configured in other environments where a payee may want the option of a virtually instant cash payout instead of a bank draft.

Figure 2:
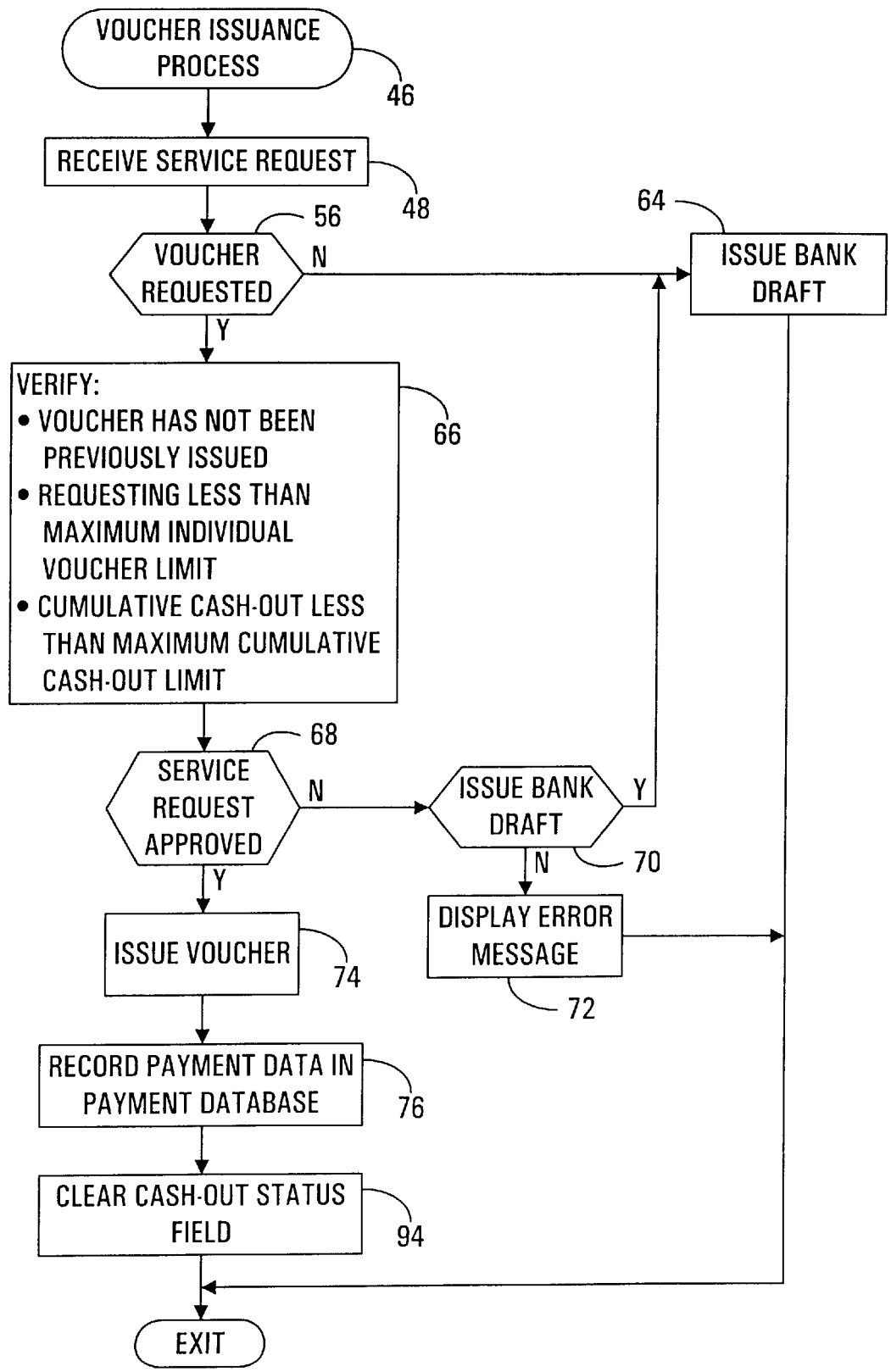
FIG. 2 shows a flowchart of a voucher issuance process performed by a service terminal of the automated voucher cash-out system.

FIG. 2 shows a flowchart of a voucher issuance process 46 performed by service terminal 22 of voucher cash-out system 20. Voucher issuance process 46 is performed by service terminal 22 in order to issue a voucher (discussed below) to an employee following the completion of work. Process 46 begins with a task 48.

Task 48 causes service terminal 22 to receive a service request. FIG. 3 shows an illustration of an exemplary work ticket 50, which is a service request supplied by the employee in the preferred embodiment. Work ticket 50 includes an employee identifier 52 associated with the employee and a quantity of hours worked 54 by the employee. In addition, work ticket 50 may include the date worked, authorizing signatures, and so forth. Employee identifier 52 may be the employee's name, an identification number, or any other designator unique to that employee. In addition the work performed, as symbolized by quantity of hours worked 54, may be any task completion designator used to calculate the amount of pay entitled by the employee.

Referring to process 46 (FIG. 2), entry of employee identifier 52 and hours worked 54 from work ticket 50 into service terminal 22 causes a payroll processing routine to be invoked in task 48. Task 48 may be performed automatically in response to an employee inserting work ticket 50 into a card reader (not shown) that forms part of service terminal 22. Alternatively, a service representative (not shown), may manually enter employee identifier 52 and hours worked 54 from work ticket 50 via a keyboard (not shown) of service terminal 22 in order to begin process 46.

Figure 4:
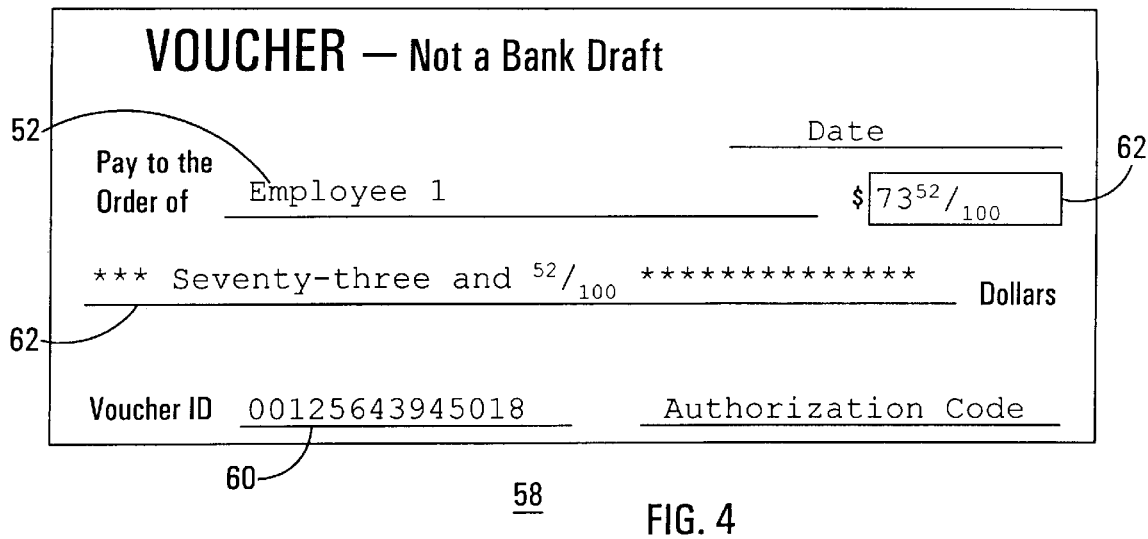
FIG. 4 shows an illustration of an exemplary voucher.

In response to task 48, a query task 56 determines if a voucher is requested. To further clarify process 46, FIG. 4 shows an illustration of an exemplary voucher 58. Voucher 58 is issued when the employee wishes to receive a cash disbursement from cash machine 28 (FIG. 1) instead of the conventional bank draft, or paycheck. Voucher 58 includes employee identifier 52, a voucher identifier (VOUCHER ID) 60, and a cash worth 62. Voucher 58 may also include date, authorization code, and so forth.

In the preferred embodiment, voucher identifier 60 is a fourteen digit number, the last four digits being a randomly assigned number. Cash worth 62 represents the pay entitled to the employee based on employee identifier 52 and quantity of hours worked 54 (FIG. 3). Voucher 58 is similar in appearance to the conventional paycheck, however, voucher 58 is clearly identified as a voucher. Hence, voucher 58 may be used to obtain a cash disbursement from cash machine 28, but may not be cashed at a bank or check-cashing service.

With reference back to task 56 of process 46 (FIG. 2), service terminal 22 determines if voucher 58 is requested. When voucher 58 is not requested in query task 56, process 46 proceeds to a task 64. Task 64 causes service terminal 22 to print a conventional paycheck (not shown). Payment data related to issuance of the paycheck may be recorded in payment database 32 (FIG. 1). Following task 64, process 46 is exited with no voucher issued.

When query task 56 determines that voucher 58 (FIG. 3) is requested, process control proceeds to a task 66. Task 66 causes service terminal 22 to initiate a verification procedure on the service request, or work ticket 50 (FIG. 3), before voucher 58 can be issued. Task 66 verifies that voucher 58 has not previously been issued in response to work ticket 50. Task 66 also verifies that work ticket 50 does not result in voucher 58 exceeding a maximum individual voucher limit. In other words, a voucher may not be issued if cash worth 62 (FIG. 4) is greater than a specific dollar amount, for example if cash worth 62 is greater than one hundred dollars.

In addition, task 66 verifies that the issuance of voucher 58, in response to work ticket 50, does not cause cash machine 28 (FIG. 1) to exceed a maximum cumulative cash-out limit for cash machine 28. Maximum cumulative cash-out limit is the cumulative, or total, amount of money that cash machine 28 may disburse to a plurality of employees over a period time. This limit prevents cash disbursement machine 28 from unexpectedly running out of cash.

Verification task 66 may also include other tasks such as verifying that the employee has not previously received a voucher with a given time period. For example, only one voucher 58 may be issued to an employee per day. The verification procedure of task 66 provides a level of security for the contracting agency using system 20 to prevent fraudulent collection of additional cash from cash machine 28.

In connection with task 66, a query task 68 is performed. Query task 68 causes service terminal 22 to determine if the service request, work ticket 50 (FIG. 3), is approved. The service request is approved when work ticket 50 successfully meets all of the verification criteria set forth in verification task 66.

When query task 68 determines that the service request is not approved, process control proceeds to a query task 70. Query task 70 determines if a bank draft, i.e., paycheck, may be issued. Service terminal 22 performs query task 70 by reviewing the verification information from task 66. For example, a bank draft may be issued if cash worth 62 (FIG. 4) exceeds the individual voucher limit, or if cash worth 62 would have caused the cumulative cash-out of cash machine 28 (FIG. 1) to exceed the maximum cumulative cash-out limit. Alternatively, a bank draft may not be issued if voucher 58 (FIG. 4) was previously issued in response to work ticket 50.

When query task 70 determines that a bank draft may be issued, program control loops back to task 64 to issue a bank draft and exit process 46.

When query task 70 determines that a bank draft may not be issued, process 46 proceeds to a task 72. Task 72 causes service terminal to display an error message. In response to task 72, process 46 is exited without issuance of voucher 58.

When query task 68 determines that the service request is approved, process 46 proceeds to a task 74. Task 74 causes service terminal 22 to issue voucher 58 (FIG. 4). Thus a voucher is produced having a cash worth representative of a cash disbursement to be made.

In connection with task 74, a task 76 is performed. Task 76 causes service terminal 22 (FIG. 1) to record payment data in payment database 32 (FIG. 1) of processor 24 (FIG. 1).

FIG. 5 shows an illustration of payment database 32 including exemplary payment data. Payment database 32 includes a date field (DATE) 78, employee identifier field (EMPLOYEE ID) 80, and bank draft section which includes a check issued field (ISSUE) 82 and a check number field (NO.) 84. In addition, database 32 includes a voucher section which combines the data associated with issuance of voucher 58 (FIG. 4). The voucher section includes a voucher issued field (ISSUE) 86, a voucher identifier field (VOUCHER ID) 88, a cash worth field (CASH WORTH) 90, and a cash-out status field (CASH-OUT) 92.

Those skilled in the art will recognize that payment database 32 may be configured any number of ways and may include more fields with additional data. For example, payment database 32 may include additional fields for payroll deductions, hourly wage received by the employee, employment history, and so forth.

Task 76 causes service terminal 22 to record payment data in the appropriate fields of payment database 32 concurrent with issuance of voucher 58 (FIG. 4). In addition to task 76, a task 94 causes processor 24 (FIG. 1) to clear cash-out status field 92 (FIG. 5) of payment database 32 concurrent with issuance of voucher 58.

Referring briefly to payment database 32 (FIG. 5), task 76 causes employee identifier 52 to be placed in employee identifier field 80, voucher identifier 60 to be placed in voucher identifier field 88, and cash worth 62 to be placed in cash worth field 90. Thus, voucher 58 is identified by voucher identifier 60 and represents a cash worth 62 in response to employee identifier 52 and quantity of hours worked 54 (FIG. 2). Furthermore, cash-out status field 92 associated with voucher identifier 60 is clear which indicates that voucher 58 has not yet been cashed.

Those skilled in the art will recognize that cash-out status field 92 indicates a change of state. In other words, a change of state from a voucher that has not yet been cashed out to a voucher that has been cashed out. Accordingly, in an alternate embodiment, a clear cash-out status field 92 may be configured to indicate that an associated voucher has been cashed out. While a non-clear (i.e. flagged) cash-out status field 92 may be configured to indicate that the associated voucher has not been cashed out.

Following task 94 (FIG. 2), process 46 is exited with voucher 58 produced. It should be readily apparent to those skilled in the art that process 46 may be configured to loop back to task 48 following any of tasks 64, 72, and 94 so that service terminal 22 may await receipt of a subsequent work ticket 50. Furthermore, in an alternate embodiment, an employee may request that a portion of the earned cash resulting from work ticket 50 be issued as a voucher and a the remaining portion of the earned cash resulting from work ticket 50 be issued as a conventional paycheck. In such a case, both issue tasks 64 and 74 would be performed.

Figure 6:
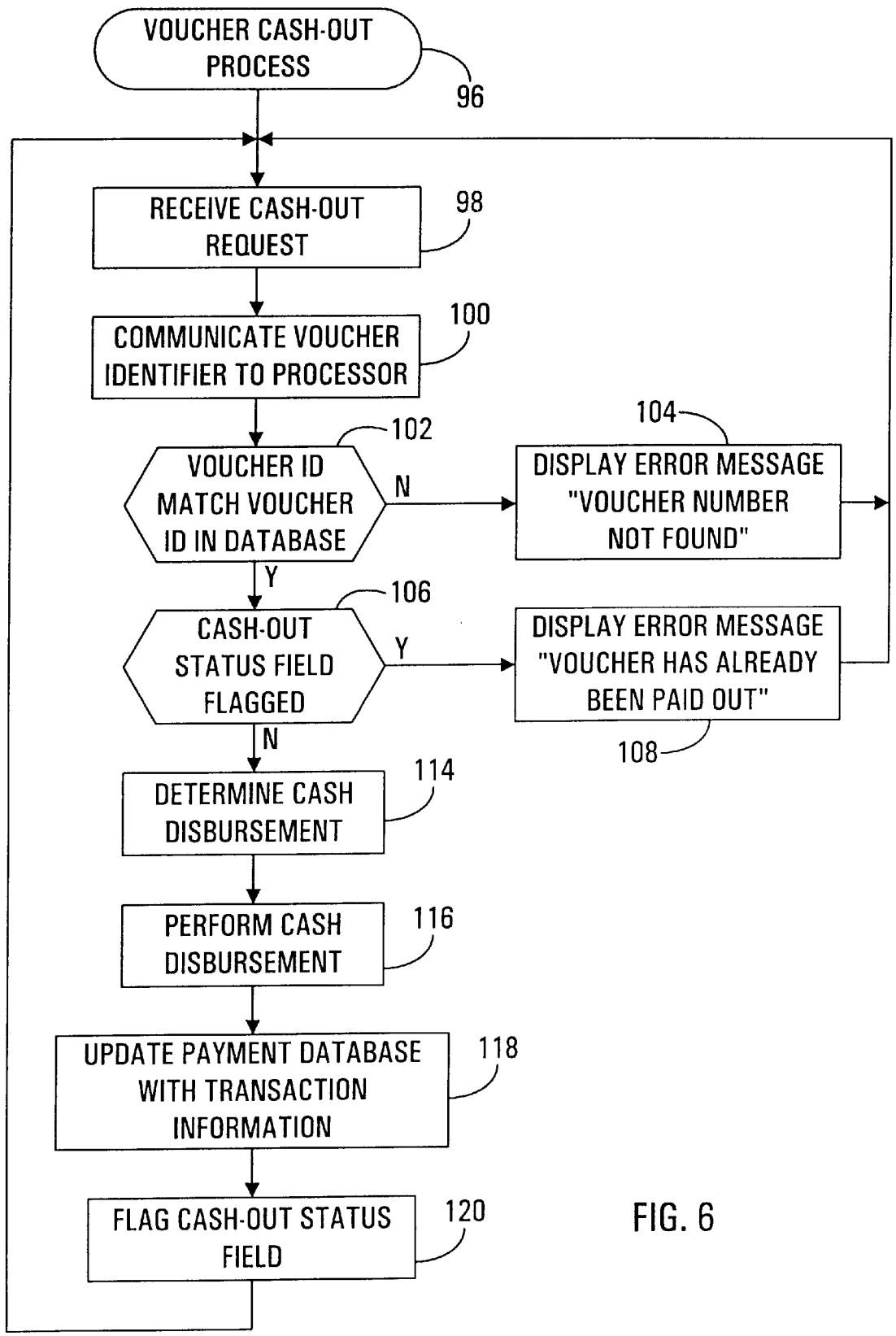
FIG. 6 shows a flowchart of a voucher cash-out process.

FIG. 6 shows a flowchart of a voucher cash-out process 96 for performing a cash disbursement from automated cash disbursement machine 28 (FIG. 1). Due to the nearby location of cash disbursement machine 28 to service terminal 22 (FIG. 1), an employee can immediately move from terminal 22 to cash machine 28 to receive his or her cash disbursement. Furthermore, since payment database 32 (FIG. 5) is updated in connection with issuance of voucher 58, voucher cash-out process 96 may be performed immediately following issuance of voucher 58 in process 46 (FIG. 2). However, nothing prevents an employee from cashing voucher 58 at a later time or date. Those skilled in the art will recognize that voucher cash-out system 20 (FIG. 1) may be configured to accept voucher 58 for a limited time, for example, no later than forty-eight hours following issuance of voucher 58, to prevent fraudulent disbursement of cash.

Process 96 begins with a task 98. Task 98 causes initiation of process 96 by receiving a cash-out request. In the preferred embodiment, the cash-out request is received when an employee presses a specific one of screen entry buttons 36 (FIG. 1) of cash disbursement machine 28 (FIG. 1) followed by entry of voucher identifier 60 (FIG. 4) from voucher 58 via keypad 38 (FIG. 1).

In response to a received cash-out request in task 98, process 96 proceeds to a task 100. Task 100 causes cash disbursement machine 28 to communicate voucher identifier 60 to processor 24 (FIG. 1) via communication link 30 (FIG. 1).

Following task 100, a query task 102 determines if voucher identifier 60 matches a corresponding voucher identifier in payment database 32 (FIG. 5). Processor 24 compares voucher identifier 60 with each of the voucher identifiers in voucher identifier field 88 in order to find a match. When a match is not found in query task 102, process control proceeds to a task 104.

Task 104 causes automated cash disbursement machine 28 to display an error message that indicates that a match was not found. For example, an error message stating "VOUCHER NUMBER NOT FOUND" may be displayed on user screen 34 (FIG. 1). A match may not be found if an employee accidentally enters an incorrect voucher identifier, or if an attempt is made to fraudulently receive cash from automated cash machine 28 by inventing a voucher identifier. Following task 104, process 96 loops back to task 98 to await receipt of another cash-out request.

When processor 24 determines a match between voucher identifier 60 and the corresponding voucher identifier in database 32, process 96 proceeds to a query task 106. A match occurs when processor 24 locates voucher identifier 60 in voucher identifier field 88 (FIG. 5) of payment database 32.

Query task 106 determines if cash-out status field 92 (FIG. 5) corresponding to voucher identifier 60 is flagged. Query task 106 causes processor 24 (FIG. 1) to review cash-out status field 92 associated with a particular voucher identifier to validate the voucher prior to a cash disbursement. Validation of the voucher includes determining if the voucher has already been paid out. Thus, query task 106 prevents fraudulent receipt of additional cash disbursements using the same voucher identifier.

When query task 106 determines that cash-out status field 92 for a corresponding voucher identifier is flagged process control proceeds to a task 108. Referring momentarily to exemplary payment database 32 (FIG. 5), a designator 110 in cash-out status field 92 associated with a voucher identifier 112, indicates that a voucher related to voucher identifier 112 has already been paid out. In response to designator 110, task 108 (FIG. 6) causes automated cash machine 28 to display an error message that indicates that the voucher was already paid out. For example, an error message stating "VOUCHER HAS ALREADY BEEN PAID OUT" may be displayed on user screen 34 (FIG. 1). Following task 108, program control loops back to task 98 to await receipt of another cash-out request.

When query task 106 determines that cash-out status field 92 associated with voucher identifier 60 is not flagged, indicating that voucher 58 has not been previously cashed out, process 96 proceeds to a task 114.

Task 114 determines a cash disbursement to the employee. In other words, task 114 causes processor 24 (FIG. 1) to obtain cash worth 62 (FIG. 5) from payment database 32 (FIG. 5) to determine how much cash will be distributed into cash tray 40 (FIG. 1) of cash disbursement machine 28. The cash disbursement is related to cash worth 62 but may not be equal to cash worth 62. For example, the coinage associated with cash worth 62 and a nominal processing fee (not shown) may be subtracted from cash worth 62 to determine a cash disbursement to the employee.

Referring momentarily to exemplary payment database 32, a match was determined in task 102 between voucher identifier 60 received in the cash-out request of task 98 and voucher identifier 60 in voucher identifier field 88. The associated cash-out status field was then determined to be clear (i.e. unflagged) in query task 106. Hence, task 114 causes processor 24 to obtain cash worth 62 from cash worth field 90. In this exemplary case, cash worth 62 is equal to seventy-three dollars and fifty-two cents. Thus, the amount of cash received by the employee may be seventy-two dollars (i.e. cash worth 62 less the coinage and the processing fee).

Referring to process 96 (FIG. 6), following determination of the cash disbursement in task 114, program control proceeds to a task 116. Task 116 causes cash disbursement machine 28 (FIG. 1) to perform the cash disbursement of voucher 58 (FIG. 4). The cash disbursement is automatically placed in cash tray 40 (FIG. 1) of automated cash disbursement machine 28 for receipt by the employee. The efficiently provided cash and nominal processing fee results in a system that is less time consuming and costly to the employee than driving to, or otherwise being transported to, a bank or check cashing service.

In response to task 116, a task 118 updates payment database 32 (FIG. 5) with transaction information. Such transaction information may include transaction complete indication, recording batch number of the transaction, and so forth for later general ledger posting. This transaction information is known by those skilled in the art and will not be described in detail herein.

In connection with task 118, a task 120 flags cash-out status field 92 associated with voucher identifier 60 to indicate that voucher 58 was paid out. In exemplary payment database 32 (FIG. 5) flagging is indicated by designator 110. Following task 120, process 96 loops back to task 98 to await receipt of another cash-out request.

It should be readily apparent by those skilled in the art, that voucher cash-out system 20 (FIG. 1) performs other conventional bookkeeping activities in combination with human operators, such as loading cash disbursement machine 28 (FIG. 1) with money, preparing general ledger summaries, and so forth that will not be described in detail herein.

In summary, an automated voucher cash-out system and method are provided for performing a cash disbursement to an employee. The system and method are able to perform a cash disbursement immediately following issuance of a voucher since the payment database is continuously updated in response to voucher issue. In addition, the cash disbursement to the employee is performed in the same vicinity as voucher issuance due to the proximate location of the cash disbursement machine relative to the service terminal and the networking of the processor between the service terminal and cash disbursement machine. Furthermore, security measures are instituted to prevent fraudulent removal of cash from the cash disbursement machine. Thus, the system and method is able to cost effectively and securely perform a cash disbursement to an employee.

Although the preferred embodiments of the invention have been illustrated and described in detail, it will be readily apparent to those skilled in the art that various modifications may be made therein without departing from the spirit of the invention or from the scope of the appended claims. For example, additional cash disbursement machines and service terminals may be configured to communicate with the processor and access the payment database so that a greater number of employees may be served at the same time.

What is claimed is:

1. An automated voucher cash-out system, said system comprising:

a service terminal for producing a voucher in response to a received service request;

a processor in communication with said service terminal for managing a cash disbursement of said voucher; and an automated cash disbursement machine in communication with said processor, said cash disbursement machine being configured to perform said cash disbursement in response to validation of said voucher by said processor.

2. A voucher cash-out system as claimed in claim 1 wherein said service terminal is configured to produce one of a bank draft and said voucher in response to said service request.

3. A voucher cash-out system as claimed in claim 1 wherein said service terminal is configured to produce both a bank draft and said voucher in response to said service request.

4. A voucher cash-out system as claimed in claim 1 wherein said service terminal is configured to approve said service request prior to producing said voucher.

5. A voucher cash-out system as claimed in claim 1 wherein:

said processor includes a payment database; and said service terminal is configured to record payment data in said payment database in response to said service request, said payment data including a payee identifier and a voucher identifier associated with said voucher.

6. A voucher cash-out system as claimed in claim 5 wherein said payment database includes a cash-out status field associated with said voucher identifier, said cash-out status field being configured to provide cash-out status of said cash disbursement.

7. A voucher cash-out system as claimed in claim 6 wherein said processor is configured to clear said cash-out status field when said service terminal records said payment data in said payment database.

8. A voucher cash-out system as claimed in claim 7 wherein said processor is further configured to flag said cash-out status field when said automated cash disbursement machine performs said cash disbursement.

9. A voucher cash-out system as claimed in claim 6 wherein:

said automated cash disbursement machine is configured to communicate said voucher identifier to said processor in response to a cash-out request; and said processor is configured to review said cash-out status field associated with said voucher identifier to validate said voucher prior to said cash disbursement.

10. A voucher cash-out system as claimed in claim 1 wherein:

said service request is a work ticket supplied by an employee;

said work ticket includes an employee identifier and a quantity of hours worked;

said voucher represents a cash worth in response to said employee identifier and said quantity of hours worked; and said automated cash disbursement machine provides said employee with said cash disbursement relative to said cash worth.

11. A voucher cash-out method comprising the steps of:

producing a voucher representative of a cash disbursement to be made;

validating said voucher;

performing said cash disbursement of said voucher; and flagging a cash-out status field associated with said voucher in a payment database following said performing step.

12. A method as claimed in claim 11 wherein said producing step comprises the steps of:

receiving a service request for said voucher;

approving said service request;

issuing said voucher;

recording payment data associated with said voucher in said payment database, said payment data including a payee identifier and a voucher identifier associated with said voucher; and clearing a cash-out status field associated with said voucher in said payment database prior to said performing step.

13. A method as claimed in claim 12 wherein said approving step comprises the step of verifying that a voucher has not previously issued in response to said service request.

14. A method as claimed in claim 12 wherein said approving step comprises the step of verifying that said service request is requesting less than a maximum individual voucher limit.

15. A method as claimed in claim 12 wherein said performing step is performed by an automated cash disbursement machine, and said approving step comprises the step of verifying that said service request causes the cumulative cash-out of said cash disbursement machine to be lower than a maximum cumulative cash-out limit for said automated cash disbursement machine.

16. A method as claimed in claim 12 wherein:

said issuing step includes the step of associating a cash worth with said voucher;

said recording step includes the step of recording said cash worth in association with said voucher identifier in said payment database;

said performing step includes the step of accessing said payment database to obtain said cash worth; and said performing step includes the step of determining said cash disbursement relative to said cash worth.

17. A method as claimed in claim 11 wherein said voucher is associated with a voucher identifier, and said validating step comprises the step of determining a match between said associated voucher identifier and a corresponding voucher identifier in said payment database.

18. A payroll voucher cash-out system for providing an employee with a cash disbursement relative to a quantity of hours worked, said system comprising:

a service terminal for producing one of a payroll bank draft and a payroll voucher in response to a received work ticket, said work ticket including an employee identifier associated with said employee, and said work ticket including said quantity of hours worked by said employee;

a processor in communication with said service terminal for managing said cash disbursement of said payroll voucher, said processor including a payment database configured to store payment data including said employee identifier and a voucher identifier associated with said payroll voucher; and an automated cash disbursement machine in communication with said processor, said cash disbursement machine being configured to perform said cash disbursement to said employee in response to validation of said voucher identifier by said processor.

19. A payroll voucher cash-out system as claimed in claim 18 wherein:

said payment database includes a cash-out status field associated with said voucher identifier; and said cash disbursement machine is configured to prevent said cash disbursement when said cash-out status field is flagged.

20. A payroll voucher cash-out system as claimed in claim 18 wherein:

said automated cash disbursement machine is a first automated cash disbursement machine;

said service terminal is configured to produce a second payroll voucher in response to a received work ticket from a second employee;

said payment database is configured to store payment data including a second employee identifier and a second voucher identifier associated with said second payroll voucher; and said system further comprises a second automated cash disbursement machine in communication with said processor, said second cash disbursement machine being configured to perform a second cash disbursement to said second employee in response to validation of said second voucher identifier by said processor.

* * * * *